May 16, 1950     K. MAHNKE ET AL     2,508,180
MULTISPEED ALTERNATING-CURRENT DRIVE FOR WINCHES
Filed Aug. 19, 1948
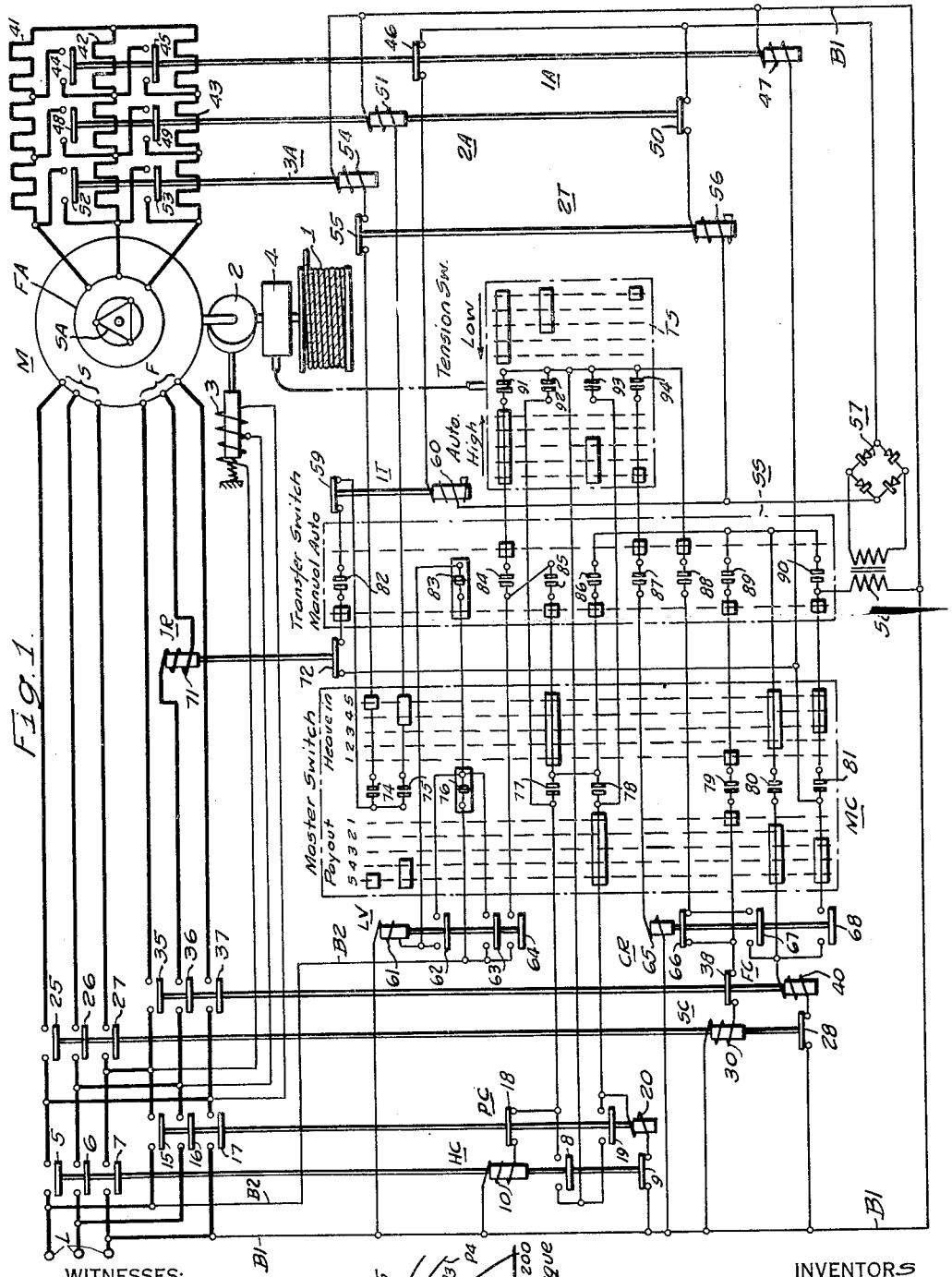
INVENTORS
Kurt Mahnke and
James W. York.
BY
C. M. Avery
ATTORNEY Patented May 16, 1950

2,508,180

UNITED STATES PATENT OFFICE 2,508,180

MULTISPEED ALTERNATING-CURRENT DRIVE FOR WINCHES

Kurt Mahnke, Alden, and James W. York, Williamsville, N. Y., assignors to Westinghouse Electric Corporation, East Pittsburgh, Pa., a corporation of Pennsylvania Application August 19, 1948, Serial No. 45,146

2 Claims. (Cl. 318—224)

Our invention relates to multi-speed alternating-current drives for hoist or winch equipment such as mooring or towing winches.

It is an object of the invention to provide a drive system, operating with an alternating-current motor, that affords a reliable and smooth control of the motor speed and torque within a wide range of speed-torque conditions.

Another object of the invention, subsidiary to the foregoing, is to provide an alternating-current drive, especially for mooring winches and the like equipment, that permits a manual control as well as an automatic control, the latter being dependent upon a variable operating condition, such as the tension or paid-out length of the winch line or cable.

These and other objects of our invention will be apparent from the following description.

According to the invention, we provide the system with an alternating-current induction motor equipped with a plurality of stator windings of respectively different pole numbers and a corresponding plurality of rotor windings. At least one armature winding for low speed is shorted within the motor, and at least one armature winding for high speed has slip rings connected to controllable external resistors. Preferably, we provide a motor with two stator windings with a pole ratio of 1 to 3 or 1 to 4 and short the appertaining armature winding for low speed, while connecting external resistors to the high-speed winding. We energize the two stator windings selectively and for reversible running direction of the motor and change the resistance of the external resistors by means of contactors, relays and switching devices in the manner and with the aid of circuits as exemplified by the drawing and explained hereinafter.

The drawing shows, in Figure 1, the diagram of a mooring winch for selective manual and automatic operation, and, in Fig. 2, a set of speed-torque characteristics typical for the performance of such a system.

In Fig. 1, the cable drum 1 of the winch is driven through a suitable transmission by an alternating-current motor M and equipped with a spring-set friction brake 2 with a magnetic releasing coil 3. The transmission between the drum 1 and the motor includes a tensiometric device 4 which serves to adjust a switch TS in either direction from its off position depending upon whether the tension of the winch cable departs in one or the other sense from a given range. Such tensiometric devices are well known for winch-control purposes. They comprise, for instance, a planetary or differential gear whose input and output members are connected with the drum and the motor, respectively. The planetary or intermediate member is normally held by spring force in a given position which corresponds to the off position of the appertaining electric switch. When the drum torque exceeds the motor torque a given amount, the intermediate gear member and the switch deflect in one direction against the opposing force of the spring; and when the motor torque exceeds the drum torque by a given amount, the intermediate member and switch deflect in the other direction. In this manner, the differential torque is used as a measure of the tension in the winch cable. In view of the fact that such tensiometric devices are known and customary in this art, details of the device are not illustrated in the drawing. If desired, United States Patent 2,280,932 may be referred to for an illustration of such a device.

The motor M is of the wound rotor type. It has two stator windings with respective terminal groups S and F for respectively different synchronous speeds. The pole ratio of the stator windings, and hence the corresponding ratio of the synchronous speeds, may be 1 to 2, 1 to 3, or 1 to 4, for instance. The stator terminals S and F are connected to line terminals L under control by four contactors HC, PC, SC and FC. Contactors HC and PC are connected between the motor and the line terminals in respectively different polarities or phase sequences of connection, so that the running direction of motor M depends upon which of contactors HC and PC is picked up at a time. The contacts of contactor HC are denoted by 5 through 9 and the appertaining control coil by 10. The corresponding contacts 15 through 19 of contactor PC are controlled by a coil 20.

Contactor SC has main contacts 25, 26, 27 for energizing the stator terminals S and is also equipped with an interlock contact 28, all contacts being controlled by a coil 30. The main contacts 35, 36, 37 of contactor FC serve to energize the stator terminals F and are controlled together with an interlock contact 38 by a coil 40.

The motor M is equipped with two armature windings schematically represented at SA and FA. Winding SA corresponds to the stator winding for slow synchronous speed which is attached to the terminals S and controlled by contactor SC. Armature winding SA is short-circuited within the motor. Armature winding FA corresponds to the stator winding for high synchronous speed which is attached to the terminals F and controlled by the contactor FC. Armature winding FA is connected through slip rings with external resistors 41, 42, 43. When one of the stator windings, i. e. one of terminal groups S and F, is energized, the rotor winding corresponding to the other stator winding is ineffective as the voltages induced in parts of that winding cancel each other.

Resistors 41, 42 and 43 have taps so that sections of these resistors can be progressively short-circuited or opened in order to vary the total resistance effective in the external circuit of the armature winding FA. The resistance is controlled by accelerating contactors 1A, 2A and 3A. Contactor 1A has contacts 44, 45, 46 controlled by a coil 47; contactor 2A has corresponding contacts 48, 49, 50 controlled by a coil 51; and contactor 3A has contacts 52, 53 controlled by a coil 54. The circuit for coil 54 of contactor 3A extends through the contact 55 of a timing relay 2T whose coil is denoted by 56. This coil circuit is energized from a rectifier 57 which is connected through a transformer 58 to the line terminals L. The coil circuits for contactors 1A and 2A extend through the contact 59 of a timing relay 1T whose control coil 60 is also energized from the rectifier 57.

Coil excitation for the above-mentioned contactors HC, PC, SC and FC is provided by buses B1 and B2 which are connected to the line terminals L, and is controlled by a master controller MC, a selector switch SS and by the above-mentioned tension responsive switch TS. As will more fully appear from the following, the coil circuits of contactors SC, FC extend through the contacts of a voltage relay LV whose coil 61 closes the appertaining contacts 62, 63, 64 only when the line voltage at terminals L is above a safe minimum value. The voltage relay LV can be made to pick up only when the master controller MC is in its off position. Consequently, when the voltage relay LV drops out due to the occurrence of voltage failure while the winch is in operation, the control system and the motor are automatically disconnected from the power supply; and the system must be reset, after recurrence of proper line voltage, by first returning the master controller MC to the off position.

The system includes a control relay CR whose coil 65 controls contacts 66, 67, 68, and a jamming relay JR whose coil 71 is series-connected between one of the terminals F and the appertaining contact 36 of contactor FC. The contact of the jamming relay JR is denoted by 72.

The master controller MC is shown in developed form as being of the cam-operated type, although a drum-type switch or a push-button arrangement may be used instead. The master controller, as exemplified in Fig. 1, has five positions in the pay-out direction and five positions in the heave-in direction in order to permit the selective operation of the winch motor with five different speed-torque characteristics in either direction. The cam-operated switches of master controller MC are denoted by numerals from 74 to 81.

The selector switch SS, also exemplified by a cam-type switch although switches of other types are applicable, is movable from an off position in either direction to a "manual" position or "automatic" position. The individual switch units of selector switch SS are denoted by 82 through 90.

The tensiometer switch TS, likewise exemplified by a cam-type design, has individual switch units 91, 92, 93 and 94 whose actuation depends upon the direction and extent of departure from the illustrated off position of the switch.

The winch control system, according to Fig. 1, operates in the following manner.

*Manual control*

When the line terminals L are properly energized and the selector switch SS placed in the illustrated off position, the motor is at rest and the contactors are deenergized. The voltage relay LV picks up because its coil 61 is energized in the circuit:

$$B1—61—83—76—B2 \qquad (1)$$

Relay LV seals itself in at contacts 62, 63 in the circuit:

$$B1—61—62—63—B2 \qquad (2)$$

and thereafter stays picked up unless voltage failure occurs in the power-supply line.

For manual operation, the selector switch SS is to be set in "manual" position. With this adjustment, a shift of the master controller MC from the off position to point 1 pay-out causes the contactor PC to pick up. Coil 20 of contactor PC is energized in the circuit:

$$B1—9—20—78—85—64—B2 \qquad (3)$$

As soon as contactor PC is in picked-up position, the contactor SC also picks up because its coil 30 is now energized in the circuit:

$$B1—30—38—79—89—86—85—64—B2 \qquad (4)$$

Contacts 15, 16, 17 and 25, 26, 27 are now closed. Motor terminals S are energized and the brake 2 is released so that the motor runs at slow speed in the pay-out direction. The short-circuited rotor winding SA with the same pole number as the stator winding S becomes effective. The speed-torque characteristic obtaining with this setting of the system is typified by the graph P1 in Fig. 2.

When the master controller MC is advanced to point 2 pay-out, the contactor SC drops out because its coil circuit (4) is opened at contact 79. Instead, the contactor FC picks up, its coil 40 being energized in the circuit:

$$B1—28—40—80—86—85—64—B2 \qquad (5)$$

Contacts 15, 16, 17 and 35, 36, 37 are now closed. The terminals F of the stator winding for fast speeds are energized, and the external resistors 41, 42 and 43 are effective in the circuit of armature winding FA with maximum resistance. The motor now accelerates to the second speed and operates, for instance, with the speed-torque characteristic according to graph P2 in Fig. 2.

The further advancement of master controller MC to point 3 pay-out has the effect of causing the accelerating contactor 1A to pick up in addition to the previously closed contactors PC and FC. Coil 47 of contactor 1A is energized in the circuit:

$$B1—47—81—90—86—85—64—B2 \qquad (6)$$

so that contacts 44 and 45 close and short one section of resistors 41, 42, 43 so that the motor accelerates to the third speed, in accordance with the speed-torque characteristic exemplified by graph P3 in Fig. 2. When the master controller MC is moved to point 4 pay-out, the accelerating contactor 2A picks up in addition to the contactors previously in closed condition. Coil 51 of contactor 2A is energized in the circuit:

$$\begin{array}{r}B1—51—75—59—82—72—\\81—90—86—85—64—B2 \qquad (7)\end{array}$$

Contacts 48 and 49 short another section of resistors 41, 42, 43 and the motor operates at fourth speed, in accordance with the characteristic exemplified by graph P4 in Fig. 2.

The coil circuit (7) of contactor 2A extends through the contact 59 of timing relay IT. Coil 60 of relay IT is normally energized through contact 46 of contactor IA so that contact 59 is open and interrupts the coil circuit (7) of contactor 2A. As soon as contactor IA picks up, relay IT becomes deenergized but drops out only after the elapse of its timing period, for instance, of ¾ to 1½ seconds. The selected timing period corresponds to the average accelerating time needed for the motor to come from second speed up to third speed. Consequently, when controller MC is moved too fast from point 3 to point 4, the picking up of contactor 2A is delayed by relay IT. In this manner, the necessary accelerating time is always provided and an abrupt speed change, which may cause shock and overstress, is prevented.

Movement of the master controller MC to point 5 pay-out has the effect of causing the accelerating contactor 3A to pick up in addition to the contactors previously closed. Coil 54 of contactor 3A is energized in the circuit:

B1—54—55—74—59—82—72—81—90— (8)
86—85—64—B2

Contacts 52, 53 now completely short the resistors 41, 42, 43 so that the motor runs at maximum speed-torque conditions, as schematically represented by the characteristic P5 shown in Fig. 2.

The coil circuit (8) of contactor 3A extends through contact 55 of the timing relay 2T. The coil 56 of relay 2T is normally energized through contact 50 of contactor 2A so that contact 55 is normally open. As soon as relay 2A picks up, coil 56 becomes deenergized but relay 2T drops out only after the elapse of its timing interval which may also amount to ¾ to 1½ seconds. As a result, the contactor 3A can operate to short-circuit the total external resistance only after the motor has been given enough time to fully accelerate to fourth speed.

It will be understood from the foregoing that the proper accelerating performance does not depend on skillful actuation of the master controller, but is secured even if the master controller is rapidly moved from the off position to the fourth or fifth speed point. When the master controller is returned from any speed position to its off position, the contactors drop out immediately and the brake becomes effective to rapidly decelerate the motor to stand still.

The heave-in performance of the motor is similar to the above-described pay-out performance, except that contactor HC picks up instead of contactor PC. During all heave-in steps, the coil 10 of contactor HC is energized in the circuit:

B1—10—18—77—85—64—B2 (9)

Jamming protection on manual control is provided for operation at points 4 and 5 of controller MC in pay-out and heave-in directions. If the current exceeds a given limit, for instance 200% of the rated full load current, relay JR picks up and opens its contact 72. This contact is included in the coil circuits (7) and (8) of relays 2A and 9A. Consequently, relay 2A, or both relays 2A and 3A, drop out when controller MC is set for fourth or fifth speed pay-out or heave-in. As a result, the speed torque is cut back to that of third speed (graph P3 in Fig. 2), at first stalling the motor or even permitting it to reverse when operating under an overhauling cable pull. After the motor is again allowed to turn in the direction of its torque, the jamming relay JR drops out and the motor reaccelerates to the speed corresponding to the load and the position of controller MC.

*Automatic control*

When a desired length of cable has been paid out by operating the controller MC, the motor can be stopped by placing controller MC in the "off" position. It is then only necessary to set the selector switch SS in "automatic" position in order to have the system automatically control the motor for maintaining the cable tension between given limits. As long as the tension remains within the proper range, the switch TS is in its "off" position so that the motor is deenergized and the friction brake is effective.

When the cable tension rises beoynd the desired limit, switch TS closes its contact 91. As a result, the contactor SC picks up because its coil 30 is energized in the circuit:

B1—30—38—66—88—91—84—64—B2 (10)

The motor is at first still deenergized because the contactors HC and PC are both open. However, when the excessive tension or cable pull further increases, the tension switch TS moves farther away from its "off" position and closes also the switch contact 93. This causes the contactor PC to pick up because its coil 20 is now energized in the circuit:

B1—9—20—93—91—84—64—B2 (11)

The motor is now energized at terminals S to run under low-speed torque conditions (graph P1 in Fig. 2) in the pay-out direction in order to relax the cable tension. If this is not sufficient to prevent a further increase in tension, switch contact 94 in tension switch TS becomes closed and energizes coil 65 of relay CR in the circuit:

B1—65—87—94—91—84—64—B2 (12)

Contact 66 of relay CR opens the coil circuit (10) of contactor SC, and contact 67 of relay CR closes instead for coil 40 of contactor FC the circuit:

B1—28—40—67—88—91—84—64—B2 (13)

Contactor FC picks up. Contact 68 of relay CR energizes coil 47 of accelerating contactor IA in the circuit:

B1—47—68—67—88—91—84—64—B2 (14)

so that contactor IA picks up and shorts part of resistors 41, 42, 43. Consequently, the motor runs in the pay-out direction at third speed (see graph P3 in Fig. 2). Now the tension in the cable is rapidly released so that switch TS returns to the off position.

If the cable slackens and the tension decreases below the proper range, switch contacts 91 and 92 of tension switch TS close. This causes contactors HC and SC to pick up. As a result, the brake is released, the motor caused to operate at slow speed in the heave-in direction, and the cable is hauled in so that its tension tends to increase to the proper value. If the motor torque is still insufficient, switch contact 94 is also closed. This energizes the relay CR with the result that contactor SC drops out while contactors FS and IA pick up, thereby adjusting the motor for operation at increased speed and torque (third speed, heave-in).

While in the above-described example the control contactors are connected with the switch TS to shift the motor between first and third speed operation, the connections, if desired, can be arranged to shift the motor between third and fourth, or generally between any lower and any higher speed, or progressively to sequentially higher or lower speeds, in dependence upon the operation of the tension-responsive switch.

It will also be understood that while we have shown the automatic operation to be controlled in response to cable tension or torque ratio, a system of this type can also be made to automatically respond to other operating conditions of the winch or the winch cable. For instance, the device denoted by 4 in Fig. 1 may respond to the departure of the paid-out cable length from given limit values. For instance, the device 4 may then include a mechanism or transmission which turns the switch TS one or the other way dependent upon the departure of the cable length from a desired value. Limit switch devices of such type are known as such for winch control purposes, and therefore not illustrated in the drawing.

It will be understood by those skilled in the art from a study of this disclosure that systems according to the invention may be modified in various respects as regards the individual mechanical and electrical components and their electric interconnections without departing from the objects and essential features of the invention and within the scope of the claims annexed hereto.

We claim as our invention:

1. An electric winch drive, comprising alternating-current terminals, a winch motor of the induction type having a plurality of stator windings for respectively different speeds and having a corresponding plurality of armature windings of which one is shorted, external resistors connected with another one of said armature windings, a movable switch having an off position and a plurality of other positions, said switch having first contacts connecting, when said switch is in one of said other positions, said terminals to the one stator winding that corresponds to the shorted armature winding, said switch having second contacts connecting said terminals to another stator winding when said switch is in a different one of said other positions, and condition-responsive actuating means connected with said switch for moving it from said off position to said other position to successively actuate said first and second contacts with an increasing departure of a winch operating condition from a desired limit value.

2. An electric winch drive, comprising alternating-current terminals, a winch motor of the induction type having two groups of stator terminals for respectively different synchronous speeds and two corresponding armature windings of which the one for the lower speed is shorted, external resistors connected with said other armature winding, reversing contactors disposed between said line terminals and said stator terminals, a selective switch having an off position and being movable in either direction from said position and connected to said contactors for controlling the motor to operate in either running direction dependent upon the direction of switch departure from said position, said switch having a plurality of contact means arranged for sequential operation during switch movement in each direction of departure, one of said contact means being operative at a lesser extent of departure to connect said line terminals to the stator terminals corresponding to the shorted armature winding, and another one of said contact means being operative at a larger extent of departure to connect said line terminals to said other stator terminals and to short part of said resistors, and condition-responsive means connected with said switch for moving it from said off position in dependence upon the direction and extent of departure of a winch operating condition from a given range.

KURT MAHNKE.
JAMES W. YORK.

REFERENCES CITED

The following references are of record in the file of this patent:

UNITED STATES PATENTS

| Number | Name | Date |
| --- | --- | --- |
| 2,280,932 | Schaelchlin | Apr. 28, 1942 |
| 2,406,781 | Lewis | Sept. 3, 1946 |